United States Patent [19]

Spears

[11] 3,908,694
[45] Sept. 30, 1975

[54] EMITTER VALVE FOR SUBTERRANEAN IRRIGATION SYSTEMS

[76] Inventor: Wayne Spears, 2840 N. Naomi, Burbank, Calif. 91504

[22] Filed: Aug. 2, 1973

[21] Appl. No.: 385,084

[52] U.S. Cl. ............... 137/513.3; 239/542; 138/46; 137/612.1
[51] Int. Cl.² ...................... B05B 1/30; F16K 15/14
[58] Field of Search ........... 137/513.3, 513.5, 513.7, 137/517, 525, 516.25, 516, 516.27, 533, 454.6, 329.01, 392.02, 329.03, 329.1, 329.2, 202, 608, 612.1; 239/542, 570, 571; 138/46

[56] References Cited
UNITED STATES PATENTS

| | | | |
|---|---|---|---|
| 1,360,960 | 11/1920 | Kudla | 137/516.25 |
| 2,056,249 | 10/1936 | Bystricky | 137/513.5 X |
| 3,025,877 | 3/1962 | Buckay | 137/513.5 X |
| 3,518,831 | 7/1970 | Tibbals et al. | 239/542 |
| 3,547,355 | 12/1970 | Salazar | 137/525 X |
| 3,693,888 | 9/1972 | Rondas et al. | 239/542 X |
| 3,719,327 | 3/1973 | McMahan | 239/542 X |
| 3,727,635 | 4/1973 | Todd | 137/513.5 |
| 3,746,263 | 7/1973 | Reeder | 137/513.5 X |
| 3,767,124 | 10/1973 | Spencer | 239/542 |
| 3,777,980 | 12/1973 | Allport | 239/542 X |

*Primary Examiner*—Charles J. Myhre
*Assistant Examiner*—Ira S. Lazarus
*Attorney, Agent, or Firm*—Gardner and Anten

[57] ABSTRACT

An emitter valve for use in a subterranean irrigation system or the like controls the flow of water to the vegetation to be irrigated over a relatively wide range of supply water pressures to maintain the flow rate at a relatively constant level. The valve construction includes a cylindrical valve chamber having an outlet opening with a peripheral seat therearound, and a cylindrical valve member of elastomeric material movably disposed in the chamber. The end surface of the valve member which faces the outlet opening has a radial flow passage which permits water from the valve chamber to flow from around the periphery of the valve to the outlet opening. The walls defining the radial flow passage are deformable against the peripheral seat around the outlet opening to reduce the cross-sectional area of the passage and control the flow rate of water therethrough as the water pressure in the system increases above a predetermined level. One or more resilient fingers extend outwardly from the end surface of the movable valve member to initially maintain the outer end of the valve member spaced from the outlet opening of the chamber to permit water initially introduced through the valve to flush foreign matter and debris from the valve.

12 Claims, 22 Drawing Figures

EMITTER VALVE FOR SUBTERRANEAN IRRIGATION SYSTEMS

The present invention relates to emitter valves, particularly for subterranean irrigiation systems and the like, which control the flow of water to vegetation to be irrigated.

In the field of irrigation it is desirable to have water released at a relatively low flow rate (sometimes referred to in the industry as a "trickle" rate) to the plant root zone of the vegetation to be irrigated in order to provide healthy and productive plants and make optimum use of the water. Accordingly, it is common to irrigate vegetation through subterranean or underground irrigation systems comprising a network of pipes buried in the ground and having a number of water outlet valves therein.

It is most desirable to maintain the flow of water through a subterranean irrigation system at a relatively constant level (e.g., approximately one gallon per hour) over a wide range of supply pressures (e.g., between about 10 psi and about 50 psi).

It is also desirable to have the valves in the outlet openings of the system relatively maintenance free, simple in construction and relatively insensitive to clogging by dirt or other debris, plant roots, corrosion, algae, and materials precipitated from the water supply. Further, it is most desirable that back flow through the irrigation system be prevented to avoid siphoning or other action that would remove water and dirt or debris from the subterranean environment and introduce it into the irrigation system.

Through the years it has been difficult to maintain the flow rate of water through a subterranean system at a constant level because of a number of factors, including wide fluctuations in the water pressure delivered to the irrigation system resulting from variations in water pressure at local pumping systems and variations in the usage of water at large pumping systems. In addition, the water pressure supplied to irrigation systems will vary according to usage within the system, flow line friction losses that cause pressure drops proportional to the distance of the outlet openings from the water source, and variations in the elevations of the outlet openings throughout the system.

It is an object of the present invention to provide an improved emitter valve which is relatively maintenance free, is simple in construction and will control the water flow rate to maintain it at a relatively constant level over a relatively wide range of supply pressures.

It is a further object of the present invention to provide an improved valve which will satisfy the requirements of preventing back flow and clogging of the valve.

The foregoing and other objects of the present invention have been realized by the valve construction of the present invention which comprises a valve casing having a chamber therein and an elastomeric member movably disposed in the chamber. An inlet opening at one end of the valve chamber communicates with an irrigation pipe and an outlet opening at the other end of the chamber communicates with the environment to be irrigated. A peripheral seat is provided around the outlet opening for engaging the outer end of the valve member when water under pressure is admitted to the valve chamber. The outer end surface of the elastomeric valve member is provided with a radially extending groove or channel which serves as a passage for water to flow from the inlet opening of the chamber to the outlet opening. The walls of this channel are deformable against a portion of the peripheral valve seat around the outlet opening when the water pressure in the system exceeds a predetermined limit. As the water pressure in the system continues to rise above the predetermined limit, the elastomeric walls of the channel in the outer end of the valve will progressively restrict the cross-sectional area of the channel, thereby progressively restricting and controlling the rate of flow of water to the outlet opening and the vegetation to be irrigated.

The outer end of the valve is normally maintained spaced from the opening of the chamber by one or more resilient fingers to permit water initially introduced into the valve chamber to flow around the valve member and flush foreign matter and debris out through the outlet opening of the casing.

Other objects, features and advantages of the present invention will become apparent from the following detailed description of two preferred embodiments of the valve construction of the present invention.

DETAILED DESCRIPTION OF PREFERRED EMBODIMENTS

Figure 1:
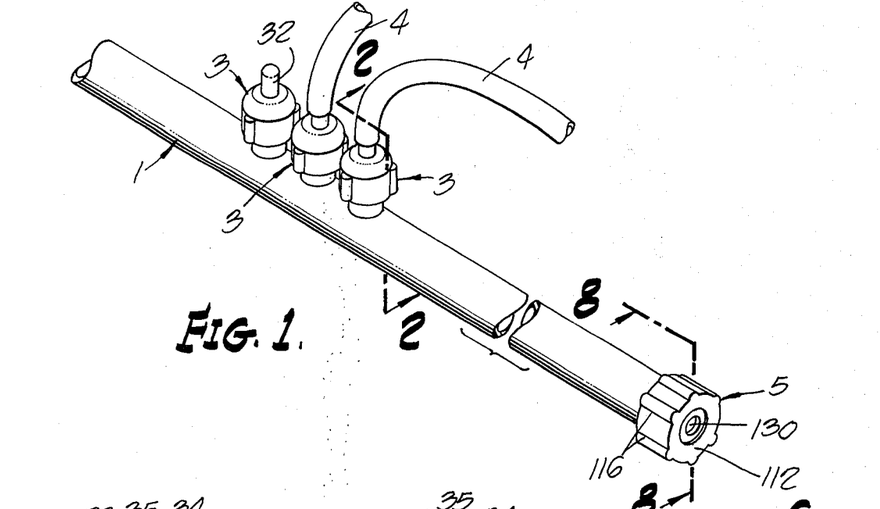
FIG. 1 is a perspective view of a portion of a subterranean irrigation pipe having a plurality of emitter valves therein constructed according to the present invention.

FIG. 1 illustrates a portion of a subterranean water distribution pipe 1 into which emitter valves constructed according to the teachings of the present invention may be installed. The irrigation pipe 1 is only one of a network of such pipes which make up an entire subterranean irrigation system. As shown in FIG. 1, a plurality of emitter valves 3 of one embodiment of the present invention are provided along the length of the irrigation pipe 1 for controlling the flow of water to a plurality of feeder lines 4, and an emitter valve 5, representing a second embodiment of the present invention, is installed in the terminal end of the pipe 1.

The feeder lines 4 connected to the emitter valves 3 may be flexible, porous tubes for supplying water to the vegetation to be irrigated, as shown in FIG. 1, or they may be relatively rigid conduits or pipes leading to other water distribution lines (not shown). The emitter valve 5 in the end of pipe 1 is adapted to permit water initially admitted to pipe 1 to initially flush debris from the pipe 1 via an opening 130 in the closure cap or cover member 112.

The construction and operation of the emitter valves 3 may best be appreciated with reference to FIGS. 2–7.

Figure 2:
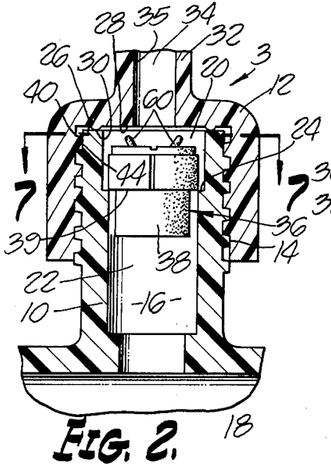
FIG. 2 is a sectional elevation view of one of the emitter valves in the irrigation pipe shown in FIG. 1, taken along line 2—2 of FIG. 1 and showing the valve member in the at-rest position it occupies when the water pressure in the irrigation pipe is off.

Each valve 3 includes a two-piece casing 10, 12. The casing includes a generally tubular section 10 having an externally threaded outer portion 14, and a cover member 12 which is internally threaded to screw onto the threaded outer portion 14 of the tubular section 10.

The tubular section 10 of the casing is preferably integrally connected to the irrigation pipe 1 and extends radially outwardly therefrom. The tubular section 10 has a valve chamber in the form of a longitudinal bore 16 extending therethrough and communicating with an opening 18 in the wall of pipe 1. The opening 18 serves as the inlet opening to the valve chamber 16. The valve chamber 16 has an outlet portion 20 and an inlet portion 22. The outlet portion 20 has a larger diameter than the inlet portion 22, thereby defining an annular seat 24 between the inlet and outlet portions of the chamber.

A tubular nipple 32 is provided on the cover member 12 for receiving the end of a suitable feeder line (e.g., tube 4, FIG. 1). The cover member 12 has an outlet opening 34 which communicates with the valve chamber 16 and opens into a longitudinal bore 35 which extends through the nipple 32. The nipple 32 may be tapered, if desired, to facilitate telescopic reception of the end of a feeder tube 4 (FIG. 1) or the like.

A generally annular seating surface 28 is provided within the cover member 12 around the periphery of the outlet opening 34, and an annular bead 30 is formed on the outer periphery of the surface 28 for establishing a continuous, peripheral seal between the seating surface 28 and the outlet end surface 26 of the tubular section 10.

A movable valve member 36 is disposed in the valve chamber 16. The valve member 36 is generally cylindrical and includes a smaller-diameter portion 38 designed to slidably fit in the smaller-diameter inlet portion 22 of the valve chamber 16 and a larger-diameter portion 40 designed to slidably fit in the larger-diameter outlet portion 20 of the chamber 16. An annular seating surface 39 extends around the valve member 36 between the larger and smaller-diameter portions, 40 and 38, respectively, for sealingly engaging the annular seat 24 in the chamber 16 when the pressure at the outlet opening 30 exceeds the pressure at the inlet opening 18.

The diameter of the larger-diameter portion 40 of the valve member 36 is larger than the diameter of the smaller-diameter inlet portion 22 of the chamber 16 so that the valve member cannot move inwardly (i.e., downwardly as viewed in FIG. 2) beyond the position of the valve member shown in FIG. 2.

A plurality of radially-outwardly extending ribs 44 (best shown in FIG. 5) are provided on the outer surface of the larger-diameter portion 40 of the valve member 36 for guiding longitudinal movement of the valve member in the chamber 16.

Figure 5:
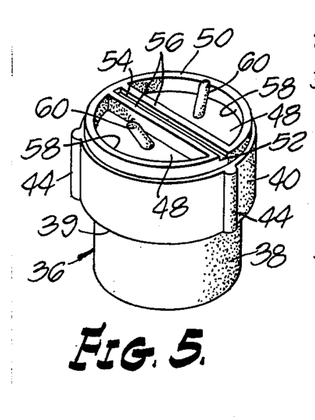
FIG. 5 is a perspective view of the valve member of the emitter valve shown in FIGS. 2-4.

As best shown in FIG. 5, the valve member 36 has an outlet end surface 48 provided with an upstanding peripheral wall 50. The peripheral wall 50 is continuous except for a single slot 52 which leads into a flow channel 54 defined by a pair of spaced, substantially parallel, upstanding wall sections 56, 56.

The upstanding peripheral wall 50 and the upstanding wall portions 56, 56 define a pair of generally semi-circular cavities 58, 58 at the outlet end of the valve member 36, as best shown in FIG. 5. A pair of flexible, resilient fingers 60 are integrally connected to the outlet end surface 48 of the valve member 36, one finger 60 being disposed in each of the semi-circular cavities 58. The resilient fingers 60 are disposed at an angle relative to the outlet end surface 48 and, as best shown in FIG. 2, normally extend upwardly and out of the semi-circular cavities 58, 58. The resilient fingers 60, 60 maintain the upper edge of the peripheral wall 50 spaced from the annular seat 28 on the cover member 12 of the casing (see FIG. 3) for a brief period when the water pressure in the irrigation system is initially turned on to permit the water which initially flows through the valve to flush foreign matter and debris from the chamber 16. These fingers 60, 60 are adapted to bend under a predetermined minimum water pressure (e.g., about 3 psi) to permit the upper edge of the peripheral wall 50 to sealingly engage the annular seat 28 (see FIG. 4).

In use, when there is no water pressure in the distribution pipe 1 the valve member 36 will occupy the position shown in FIG. 2 of the drawings with the outer peripheral portion of the annular surface 39 seated on the annular seating surface 24 in the valve chamber 16. It is to be noted that if the pressure in the subterranean environment in which the distribution pipe 1 and the emitter valves 3 are disposed is or becomes greater than the water pressure within the irrigation system of which the distribution pipe 1 is a part, the increased pressure will be transmitted to the valve member 36 through the longitudinal bore 35 of the cover member 12 and the outlet opening 34 to urge the valve member 36 inwardly (downwardly as viewed in FIG. 2) to drive the annular surface 39 on the valve 36 into sealing engagement with the annular valve seat 24 in the chamber 16, thereby preventing back flow of any dirt or debris into the inlet portion 22 of the chamber 16, the pipe 1 and the remainder of the irrigation system (not shown).

Figure 3:
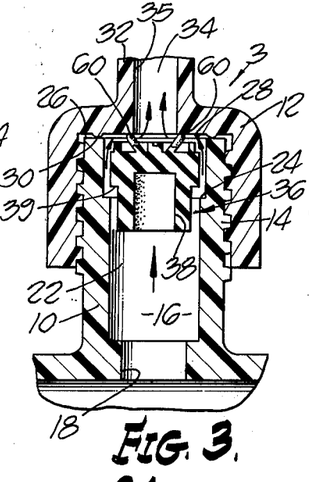
FIG. 3 is a sectional elevation view similar to FIG. 2, but showing the valve member in the position it occupies when the water pressure in the irrigation system is initially turned on to admit water under pressure to the emitter valves.

When the water pressure of the irrigation system is turned on to supply water under pressure to the distribution pipe 1 at a pressure greater than the pressure of the subterranean environment, the valve member 36 will be urged outwardly (upwardly, as viewed in FIG. 3) toward the outlet opening 34, thereby permitting water from the distribution pipe 1 to flow through the opening 18 in the pipe 1, through the inlet portion 22 of the valve chamber 16 (via the annular space between the smaller-diameter portion 38 of the valve and the internal peripheral wall of the valve chamber 16), through the outlet portion 20 of the valve chamber 16 (via the annular space between the larger-diameter portion 40 of the valve member 36 and the internal peripheral wall of the chamber, between the guide ribs 44), and through the outlet opening 34 and the longitudinal bore 35 in the cover member 12. As shown in FIG. 3, the resilient fingers 60, 60 initially maintain the upper surface of the peripheral wall 50 of the valve member 36 spaced from the peripheral seat 28 around the outlet opening 34 to permit water to flow around the upper portion of the valve member 36 and flush out any dirt or other debris or foreign matter which might have collected in the upper portion 20 of the chamber 16 when the water supply pressure was off.

Figure 4:
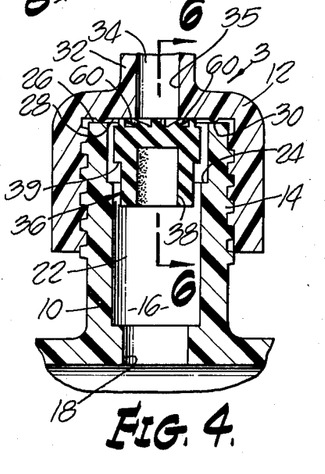
FIG. 4 is a sectional elevation view similar to FIGS. 2 and 3, but showing the valve member in the position it occupies when the water pressure in the irrigation pipe is within a normal operating pressure range.
Figure 6:
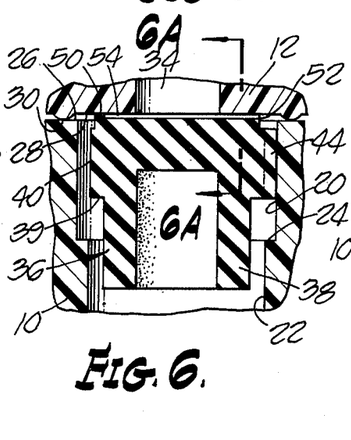
FIG. 6 is an enlarged sectional elevation view taken along line 6—6 of FIG. 4 and illustrating the function of the flow channel in the outer end of the valve member.

Shortly after the water pressure of the irrigation system has been turned on, the valve member 36 will be driven outwardly toward the outlet opening 34 and the peripheral seating surface 28 to collapse the resilient fingers 60, 60 and force the upstanding peripheral wall 50 into sealing engagement with the peripheral seat 28, as best shown in FIGS. 4 and 6. When the valve member 36 is in this position water from the irrigation pipe 1 will flow through the inlet opening 18, through the inlet portion 22 of the valve chamber 16, through the outlet portion 20 of the chamber 16, through the slot 52 in the upstanding peripheral wall 50 at the outer end of the valve member 36, through the flow channel 54 between the upstanding walls 56, 56 and through the outlet opening 34 to the vegetation to be irrigated.

Figures 6A, 6B, 8, 9, 10, 11, 12:
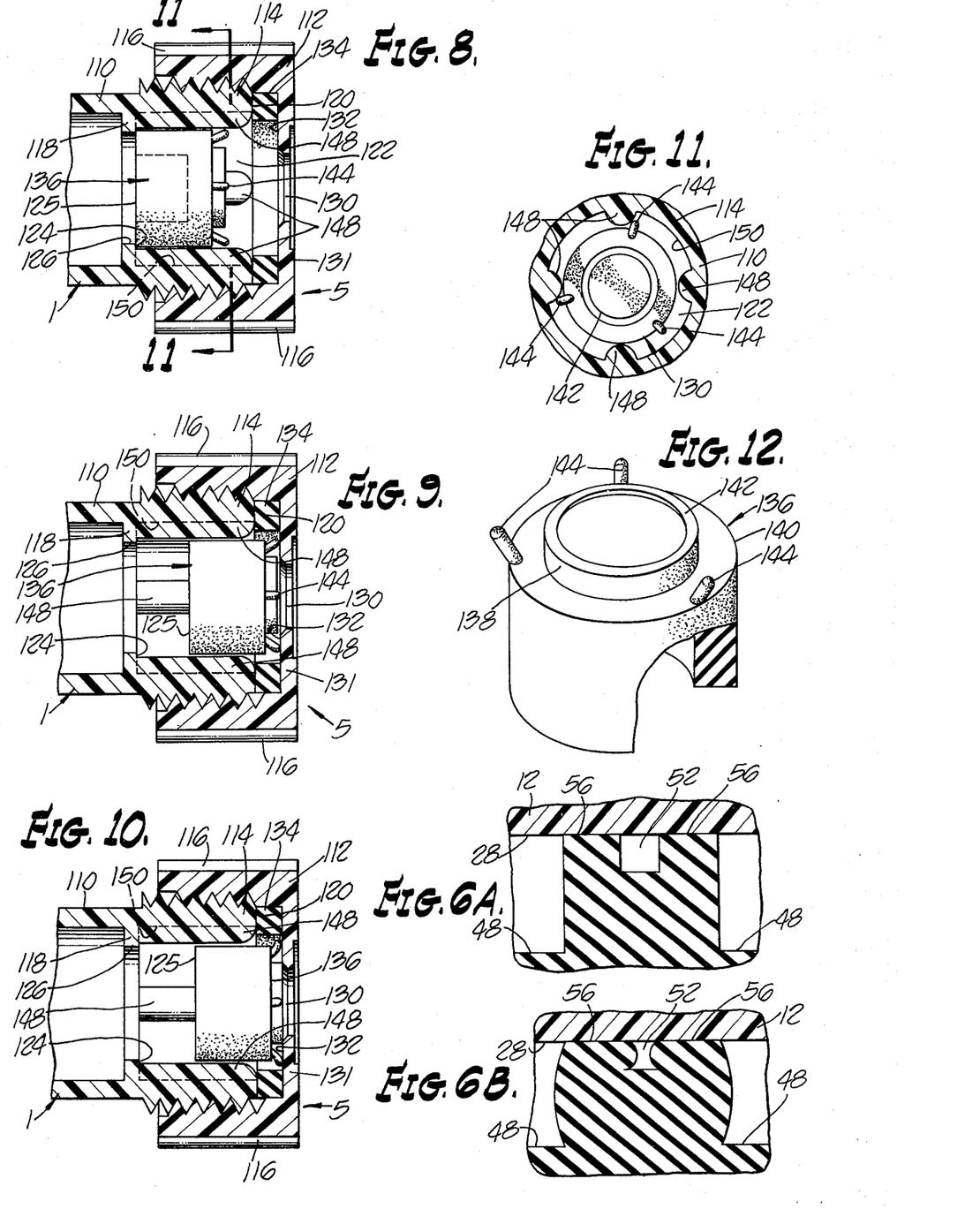
FIG. 6A is a sectional elevation view taken along the line 6A—6A of FIG. 6, showing the cross-sectional area of the flow channel when there is normal operating water pressure in the irrigation pipe.
FIG. 6B is a sectional elevation view similar to FIG. 6A, but showing the manner in which the walls of the flow channel deform and restrict flow when the pressure of the water in the irrigation pipe increases above a predetermined level.
FIG. 8 is a sectional elevation view taken along line 8—8 of FIG. 1, showing a second embodiment of an emitter valve constructed according to the present invention installed in the terminal end of the irrigation pipe of FIG. 1, the valve member being shown in the at-rest position it occupies when the water pressure in the irrigation system is off.
FIG. 9 is a sectional elevation view similar to FIG. 8, but showing the valve member in the position it occupies when the water pressure in the irrigation system is initially turned on to admit water under pressure to the irrigation pipe.
FIG. 10 is a sectional elevation view similar to FIGS. 8 and 9, but showing the valve member in the position it occupies when the water pressure in the irrigation pipe is within a normal operating pressure range, or greater.
FIG. 11 is a sectional elevation view taken along line 11—11 of FIG. 8.
FIG. 12 is a perspective view of the valve member of the embodiment of FIGS. 8–11.
Figure 7:
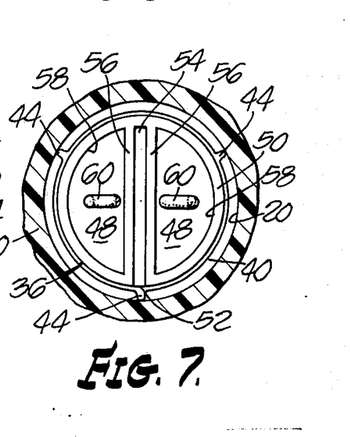
FIG. 7 is a top sectional plan view of the emitter valve taken along the line 7—7 of FIG. 2.

As best shown in FIG. 6A, as long as the pressure of the water in the irrigation system remains at or below a normal operating water pressure (e.g., about 10 psi) the cross-sectional area of the slot 52 and the channel 54 will remain unrestricted to permit free flow of water therethrough.

As the water pressure in the irrigation system increases above a predetermined level (e.g., above about 10 psi), the upstanding peripheral wall 50 at the outer end of the valve member 36 will be driven against the peripheral seat 28 around the outlet opening 34 with greater force, thereby causing the wall portions defining the slot 52 to progressively deform or buckle and reduce the cross-sectional area of the slot 52, as shown in FIG. 6B. As the walls defining the slot 52 deform and reduce the cross-sectional area of the slot, the volume of water flowing therethrough will be restricted. If the water pressure in the irrigation system continues to increase above a predetermined maximum pressure (e.g., about 50 psi), the upstanding peripheral wall 50 will be driven against the peripheral valve seat 28 around outlet opening 34 with such great force as to cause the wall portions defining the slot to completely pinch off the slot 52 and stop further flow of water therethrough.

It may thus be seen that the valve member 36, and particularly the upstanding peripheral wall 50 at the outer end thereof, will automatically compensate for increases in water pressure to control and limit the volume of water fed to the vegetation to be irrigated.

When the pressure in the irrigation system drops back to a normal level, the resilient upstanding peripheral wall 50 will spring back to the position shown in FIGS. 4, 6 and 6A to restore the slot 52 to its normal cross-sectional area and again permit water to flow therethrough to the vegetation to be irrigated.

The emitter valve 5 illustrated in FIGS. 8 – 12 is a second embodiment of the present invention. Like the valves 3 illustrated in FIGS. 1 – 7 and described above, the emitter valve 5 is designed to permit automatic flushing of dirt and other debris from the valve when the water in the irrigation system is initially turned on, and is also designed to prevent back flow of foreign matter into the valve when the pressure at the outlet opening of the valve exceeds the pressure at the inlet opening. However, the valve 5 is particularly designed to be installed in the terminal end of a water distribution pipe (see, e.g., pipe 1 in FIG. 1) and does not function to compensate for increases and decreases in the pressure of the water supply system.

The valve construction 5 includes a two-piece casing comprising the tubular end 110 of the pipe 1 and a cover member 112. The outer end 114 of the tubular section 110 is externally threaded to receive the internally threaded cover member 112.

A plurality of circumferentially spaced projections 116 are provided on the exterior surface of the cover member 112 to facilitate screwing the cover member on the outer end 114 of the tubular section 110.

An annular flange 118 extends radially inwardly from the interior wall of the tubular section 110 and is integrally connected thereto. The flange 118 is spaced from the outer end 120 of the tubular section 110 to define a valve chamber 122 in the outer end of the tubular section 110. The annular surface 124 of the flange 118 which faces the valve chamber 122 forms a seating surface for the inner end 125 of a valve member 136 disposed in the chamber 122, and an opening 126 defined by the internal peripheral edge of the flange 118 forms an inlet opening from the pipe 1 to the valve chamber 122.

An outlet opening 130 is provided in the end wall 131 of the cover member 112, and a peripheral seating surface 132 is provided around the outlet opening on the interior of the end wall 131.

An annular sealing gasket 134 is provided between the annular seating surface 132 of the cover member 112 and the outer end 120 of the tubular section 110 to form a fluid-tight joint therebetween.

A generally cylindrical valve member 136 is disposed in the valve chamber 122 for longitudinal sliding movement toward and away from the outlet opening 130.

As best shown in FIG. 12, the outer end of the valve member 136 includes an upstanding central portion 138 and a recessed outer periphery 140. The central portion 138 includes a circular lip 142 on the outer end thereof which is adapted to sealingly engage the peripheral seating surface 132 around the outlet opening 130 (see FIG. 10).

A plurality of circumferentially spaced, resilient fingers 144, 144, 144 extend upwardly and outwardly from the recessed peripheral surface 140 at the outer end of the valve member 136. As best shown in FIGS. 8, 9 and 10, the resilient fingers 144 extend slightly above the circular sealing lip 142.

A plurality of radially inwardly extending ribs 148 are integrally connected to the interior peripheral wall 150 of the valve chamber 122 for guiding longitudinal movement of the valve member 136 in the chamber 122 (see FIG. 11).

In use, when there is no water pressure in the distribution pipe 1 the valve member 136 will occupy the position shown in FIG. 8 of the drawings with the outer peripheral portion of the inner end surface 125 seated on the annular seating surface 124 in the valve chamber 122. If the pressure in the subterranean environment in which the distribution pipe 1 and the emitter valve 5 are disposed is or becomes greater than the water pressure within the irrigation system of which the distribution pipe 1 is a part, the increased pressure will be transmitted to the valve member 136 through the outlet opening 130 in the cover member 112 to urge the valve member 136 inwardly (to the left as viewed in FIG. 8) to drive the outer peripheral portion of the inner end surface 125 into sealing engagement with the annular valve seat 124, thereby preventing back flow of any dirt or debris into the pipe 1 and the remainder of the irrigation system.

When the water pressure of the irrigation system is turned on to supply water under pressure to the distribution pipe 1 at a pressure greater than the pressure of the subterranean environment, the valve member 136 will be urged outwardly (to the right, as viewed in FIG. 9), thereby permitting water from the distribution pipe 1 to flow through the inlet opening 126 of the annular flange 118, through the valve chamber 122 (via the annular space between the valve member 136 and the internal peripheral wall of the valve chamber 122, between the guide ribs 148), and through the outlet opening 130 in the cover member 112. As shown in FIG. 9, the resilient fingers 144 intially engage the annular interior surface 132 of the cover member 112 around the outlet opening 130 to initially maintain the outer end surface 133 of the valve spaced from the annular seating surface 132 to permit water to flow around the upper portion of the valve member 136 and out through the outlet opening 130 in the cover member 112. The water initially flowing through the valve chamber 122 will flush out any dirt or other debris which might have collected in the chamber when the water supply pressure of the irrigiation system was off.

Shortly after the water pressure of the irrigation system has been turned on, the valve member 136 will be driven outwardly toward the outlet opening 130 and the peripheral seating surface 124 with sufficient force to cause the resilient fingers 144 to collapse. As shown in FIG. 10, when the fingers 144 collapse, the sealing lip 142 on the upstanding central portion 138 of the valve member 136 will be driven into sealing engagement with the peripheral seating surface 124 around the outlet opening 130 of the valve chamber 122. In this position (FIG. 10) the valve member 136 blocks flow of water through the outlet opening 130.

When the water pressure in the irrigation system is turned off, the resilient fingers 144 will spring back to their original shape to urge the valve member 136 rearwardly and again open the outlet opening 130.

The emitter valve 203 shown in FIGS. 13 through 19B is similar in construction, operation and function to the valve construction 3 shown in FIGS. 1 – 7. The valve member 236 of the valve 203 represents an improvement over the valve member 36 of the embodiment of FIGS. 1 – 7 in at least one respect.

Figure 14:
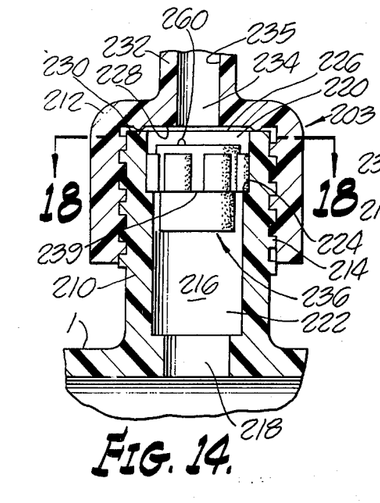
FIG. 14 is a sectional elevation view of an emitter valve constructed according to the teachings of the present invention and employing the valve member illustrated in FIG. 13, the valve member being shown in the at-rest position it occupies when the water pressure in the irrigation system is off.

The valve 203 includes a two-piece casing 210, 212. The casing includes a generally tubular section 210 having an externally threaded outer portion 214, and a cover member 212 which is internally threaded to screw onto the threaded upper portion 214 of the tubular section 210.

The tubular section 210 of the casing is preferably integrally connected to the irrigation pipe 1 (FIGS. 1 and 14 – 16) and extends radially outwardly therefrom. The tubular section 210 has a valve chamber in the form of a longitudinal bore 216 extending therethrough and communicating with an opening 218 in the wall of pipe 1. The opening 218 serves as the inlet opening to the valve chamber 216. The valve chamber 216 has an outlet portion 220 and an inlet portion 222. The outlet portion 220 has a larger diameter than the inlet portion 222, thereby defining an annular seat 224 between the inlet and outlet portions of the chamber.

A tubular nipple 232 is provided on the cover member 212 for receiving the end of a suitable feeder line (e.g., tube 4, FIG. 11). The cover member 212 has an outlet opening 234 which communicates with the valve chamber 216 and opens into a longitudinal bore 235 which extends through the nipple 232. The nipple 232 may be tapered, if desired, to facilitate telescopic reception of the end of a feeder, tube 4 (FIG. 1) or the like.

A generally annular seating surface 228 is provided within the cover member 212 around the periphery of the outlet opening 234, and an annular bead 230 is formed on the outer periphery of the surface 228 for establishing a continuous, peripheral seal between the seating surface 228 and the outlet end surface 226 of the tubular section 210.

A movable valve member 236 is disposed in the valve chamber 216. The valve member 236 is generally cylindrical and includes a smaller-diameter portion 238 designed to slidably fit in the smaller-diameter inlet portion 222 of the valve chamber 216 and a larger-diameter portion 240 designed to fit in the larger-diameter outlet portion 220 of the chamber 216. An annular seating surface 239 extends around the valve member 236 between the larger and smaller-diameter portions, 240 and 238, respectively, for sealingly engaging the annular seat 224 in the chamber 216 when the pressure at the outlet opening 234 exceeds the pressure at the inlet opening 218.

The diameter of the larger-diameter portion 240 of the valve member 236 is larger than the diameter of the smaller-diameter inlet portion 222 of the chamber 216 so that the valve member cannot move inwardly (i.e., downwardly as viewed in FIG. 14) beyond the position of the valve member shown in FIG. 14.

A plurality of radially-outwardly extending ribs 244 (best shown in FIG. 13) are provided on the outer surface of the larger-diameter portion 240 of the valve member 236 for guiding longitudinal movement of the valve member in the chamber 216.

Figure 13:
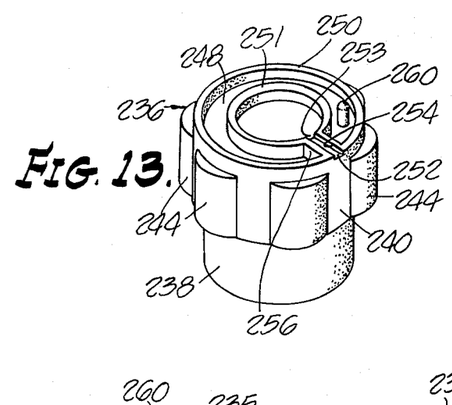
FIG. 13 is a perspective view of a third, preferred embodiment of a valve member constructed in accordance with the teachings of the present invention.
Figure 18:
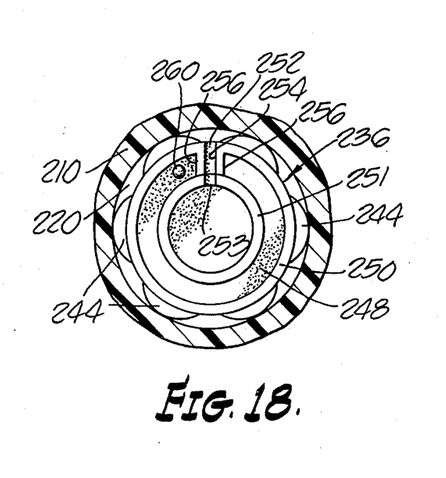
FIG. 18 is a top plan view taken along the line 18—18 of FIG. 14.

As best shown in FIGS. 13 and 18, the valve member 236 has an outlet end surface 248 provided with a pair of concentric upstanding peripheral walls 250 and 251. The peripheral walls 250 and 251 are continuous except for a single slot (252 in outer wall 250; 253 in inner wall 251) in each which leads into a common flow channel 254 defined by a pair of spaced, substantially parallel, upstanding wall sections 256, 256.

A flexible, resilient finger 260 is integrally connected to the outlet end surface 248 of the valve member 236. As best shown in FIG. 14, the upper end of the resilient finger 260 normally extends upwardly to a point slightly above the tops of peripheral walls 250 and 251. The resilient finger 260 maintains the upper edges of the peripheral wall 250 and 251 spaced from the annular seat 228 around the outlet opening 234 on the cover member 212 of the casing (see FIG. 3) for a brief period when the water pressure in the irrigation system is initially turned on to permit the water which initially inflows through the valve to flush foreign matter and debris from the chamber 216. The finger 260 is adapted to bend under a predetermined minimum water pressure (e.g., about 3 psi) to permit the upper edges of the peripheral walls 250 and 251 to sealingly engage the peripheral seat 228 (see FIG. 16).

In use, when there is no water pressure in the distribution pipe 1 the valve member 236 will occupy the position shown in FIG. 14 of the drawings with the outer peripheral portion of the annular surface 239 seated on the annular seating surface 224 in the valve chamber 216. It is to be noted that if the pressure in the subterranean environment in which the distribution pipe 1 and the emitter valve 203 is disposed or becomes greater than the water pressure within the irrigation system of which the distribution pipe 1 is a part, the increased pressure will be transmitted to the valve member 236 through the longitudinal bore 235 of the cover member 212 and the outlet opening 234 to urge the valve member 236 inwardly (downwardly as viewed in FIG. 14) to drive the annular surface 239 on the valve 236 into sealing engagement with the annular valve seat 224 in the chamber 216, thereby preventing back flow of any dirt or debris into the inlet portion 222 of the chamber 216, the pipe 1 and the remainder of the irrigation system (not shown).

Figure 15:
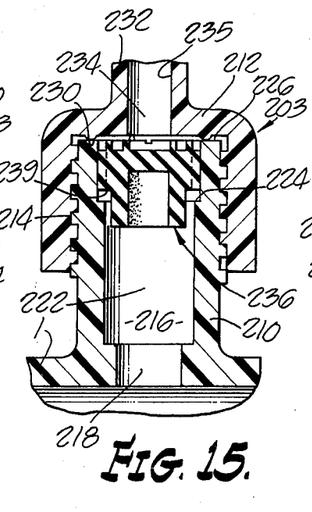
FIG. 15 is a sectional elevation view similar to FIG. 14, but showing the valve member in the position it occupies when the water pressure in the irrigation system is initially turned on to admit water under pressure to the valve.

When the water pressure of the irrigation system is turned on to supply water under pressure to the distribution pipe 1 at a pressure greater than the pressure of the subterranean environment, the valve member 236 will be urged outwardly (upwardly, as viewed in FIG. 15) toward the outlet opening 234, thereby permitting water from the distribution pipe 1 to flow through the opening 218 in the pipe 1, through the inlet portion 222 of the valve chamber 216 (via the annular space between the smaller-diameter portion 238 of the valve and the internal peripheral wall of the valve chamber 216), through the outlet portion 220 of the valve chamber 216 (via the annular space between the larger-diameter portion 249 of the valve member 236 and the internal peripheral wall of the chamber, between the guide ribs 244), and through the outlet opening 234 and the longitudinal bore 235 in the cover member 212. As shown in FIG. 15, the resilient finger 60 initially maintains the upper surfaces of the peripheral walls 250 and 251 of the valve member 236 spaced from the peripheral seat 228 around the outlet opening 234 to permit water to flow around the upper portion of the valve member 236 and flush out any dirt or other debris or foreign matter which might have collected in the upper portion 220 of the chamber 216 when the water supply pressure was off.

Figure 16:
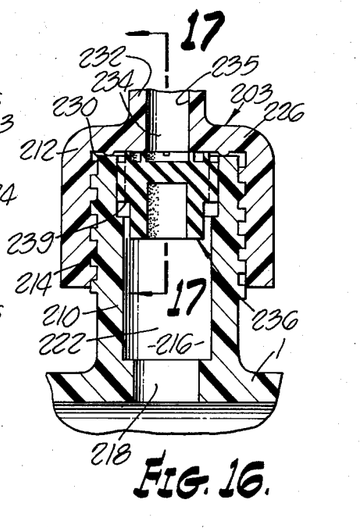
FIG. 16 is a sectional elevation view similar to FIGS. 14 and 15, but showing the valve member in the position at occupies when the water pressure in the irrigation system is within a normal operating pressure range.
Figure 17:
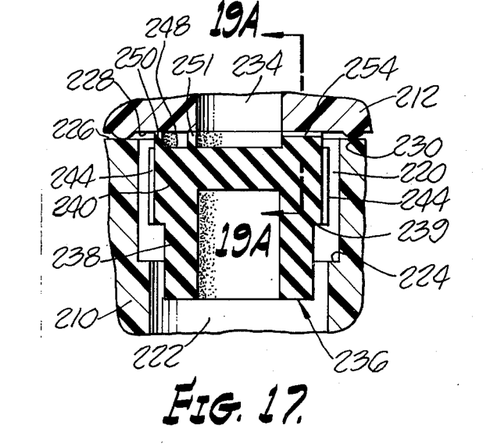
FIG. 17 is an enlarged sectional elevation view taken along the line 17—17 of FIG. 16 and showing the flow path through the valve chamber, the valve member and the outlet opening of the valve when the pressure of the water in the irrigation system is within a normal operating pressure range.

Shortly after the water pressure of the irrigation system has been turned on, the valve member 236 will be driven outwardly toward the outlet opening 234 and the peripheral seating surface 228 to collapse the resilient finger 60 and force the upstanding peripheral walls 250 and 251 into sealing engagement with the peripheral seat 228, as best shown in FIGS. 16 and 17. When the valve member 236 is in this position water from the irrigation pipe 1 will flow through the inlet opening 218, through the inlet portion 222 of the valve chamber 216, through the outlet portion 220 of the chamber 216, through the slot 252 in the upstanding outer peripheral wall 250 at the outer end of the valve member 236, through the flow channel 254 between the upstanding walls 256, 256, through the slot 253 in the upstanding inner peripheral wall 251 and through the outlet opening 234 to the vegetation to be irrigated.

Figure 19A:
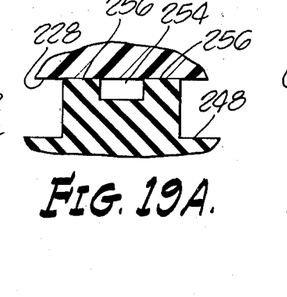
FIG. 19A is a partial sectional elevation view taken along the line 19A—19A of FIG. 17 and illustrating the structure of the flow channel in the top of the valve member when the water pressure in the irrigation system is within a normal operating pressure range.

As best shown in FIG. 19A, as long as the pressure of the water in the irrigation system remains at a or below a normal operating water pressure (e.g., about 10 psi) the cross-sectional area of the slots 252 and 253 and the channel 254 will remain unrestricted to permit free flow of water therethrough.

Figure 19B:
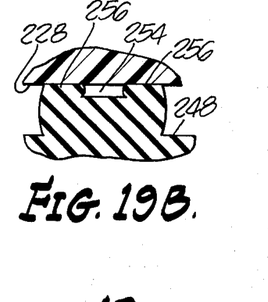
FIG. 19B is a partial sectional elevation view similar to FIG. 19A, but showing the configuration of the flow channel when the water pressure in the irrigation system exceeds a predetermined pressure.

As the water pressure in the irrigation system increases above a predetermined level (e.g., above about 10 psi), the upstanding peripheral walls 250 and 251 and the walls 256, 256 at the outer end of the valve member 236 will be driven against the peripheral seat 228 around the outlet opening 234 with greater force, thereby causing the wall portions defining the slots 252 and 253 and channel 254 to progressively deform or buckle and reduce the cross-sectional area of the channel as shown in FIG. 19B. As the walls deform and reduce the cross-sectional area of the channel 254, the volume of water flowing therethrough will be restricted. If the water pressure in the irrigation system continues to increase above a predetermined maximum pressure (e.g., about 50 psi), the upstanding peripheral walls 250 and 251 and walls 256, 256 will be driven against the peripheral valve seat 228 around outlet opening 34 with such great force as to cause the wall portions defining the slots 252 and 253 and flow channel 254 to completely pinch off the channel and stop further flow of water therethrough.

It may thus be seen that the valve member 236, and particularly the upstanding peripheral walls 250 and 251 and walls 256, 256, at the outer end thereof, will automatically compensate for increases in water pressure to control and limit the volume of water fed to the vegetation to be irrigated.

When the pressure in the irrigation system drops back to a normal level, the resilient finger 260 and the resilient upstanding walls 250, 251 and 256, 256 will spring back to the position shown in FIGS. 16, 17 and 19A to restore the channel 254 to its normal cross-sectional area and again permit water to flow therethrough to the vegetation to be irrigated.

The construction of the valve member 236 in the embodiment of FIGS. 13 – 19B represents an improvement over the construction of valve member 36 in the embodiment of FIGS. 1 – 7 in at least one respect. It was noted that when the valve member of FIGS. 1 – 7 were employed, the central portion of the upstanding parallel walls 56, 56 had a tendency to extrude out through the outlet opening 34 and pinch off the flow channel 54. This problem is obviated by the construction of the valve member 236 of FIGS. 13 – 19B where the central portion of the outer end of the valve member (i.e., the portion enclosed by the inner peripheral wall 251) is open.

The material from which the valve members (36, 136 and 236) of the valve constructions of the present invention are made should be selected to provide the desired flow rates over the range of pressure differentials expected between the water supply pressure and the pressure of the subterranean environment in which the valves are disposed. The valve members may be constructed of thermoplastic rubber, for example. By way of specific example, it has been found that where operating water pressures fall within the range of between about 10 psi and 50 psi, one suitable thermoplastic rubber which may be employed is UNIROYAL TPR rubber, and a suitable hardness for such rubber is 75 shore.

Of course, where pressure ranges below 10 psi or above 50 psi are expected to be encountered, harder or softer thermoplastic rubber or other suitable materials may be used.

It is contemplated, of course, that numerous changes, additions and modifications may be made to the specific valve constructions illustrated in the drawings and described above without departing from the spirit and scope of the present invention. Accordingly, it is intended that the scope of this patent be limited only by the following claims.

I claim:
1. An improved emitter valve for subterranean irrigation systems and the like comprising:
a valve casing having an inlet opening, an outlet opening and a valve chamber between said inlet and outlet openings;
means defining a valve seat around said outlet opening of said valve casing;
a valve member disposed in said valve chamber;
said valve member having an outer surface facing said outlet opening of said valve casing; said outer surface being formed of a resilient material; said outer surface having a center portion in substantial alignment with said outlet opening of said valve casing and an upstanding outer peripheral portion in substantial alignment with said valve seat around said outlet opening; said upstanding outer peripheral portion of said resilient outer surface being adapted to engage said valve seat around said outlet opening when fluid under pressure is introduced through said inlet opening and into said valve chamber at a pressure greater than a predetermined pressure;
means defining a radial fluid passage in said outer surface of said valve member; said radial passage extending from a point within said central portion of said outer surface and through said upstanding outer peripheral portion of said outer surface.

2. An improved emitter valve for subterranean irrigation systems and the like comprising:
a generally cylindrical valve casing having an outlet end wall, an inlet end wall and a generally cylindrical wall defining a generally cylindrical valve chamber;
an outlet opening in said outlet end wall;
a generally annular portion of said outlet end wall around said outlet opening defining a peripheral valve seat;
an inlet opening in said inlet end wall of said valve casing;
a generally cylindrical valve member disposed within said valve chamber;
said valve member having an outer end portion made of a resilient material;
said outer end portion of said valve member having a central portion facing said outlet opening of said valve casing and being substantially aligned therewith;
said outer end portion of said valve member further including an upstanding outer peripheral portion facing said peripheral seat on said outlet end wall of said valve casing and being substantially aligned therewith;
means defining a radial groove in said outlet end portion of said valve member; said radial groove extending from a point within said central portion to a point in said upstanding outer peripheral portion;
said radial groove being defined by a pair of spaced, substantially parallel wall portions of resilient material which are deformable to reduce the cross-sectional area of said groove when the pressure of the fluid introduced through said inlet opening of said valve casing exceeds a predetermined pressure to force said valve member towards said outlet opening and to force said upstanding outer peripheral portion of said outer end portion of said valve member against said peripheral valve seat;

whereby said resilient wall portions defining said groove in said outer end of said valve member will progressively deform and control the rate of flow of fluid through said outlet opening as the pressure of the fluid introduced through said inlet opening and into said valve chamber increases above a predetermined pressure.

3. An improved emitter valve according to claim 2, and further comprising a resilient member connected to said outlet end portion of said valve member and extending outwardly toward said peripheral seat around said outlet opening of said valve casing; said resilient member functioning to maintain said peripheral portion of said outer end of said valve member spaced from said peripheral seat when the fluid pressure at said inlet opening of said valve casing is below a predetermined minimum pressure to permit the fluid initially introduced through said inlet opening and said valve chamber to flush foreign matter through said valve chamber and out of said outlet opening when fluid under pressure is initially introduced through said inlet opening; said resilient member being deformable when the fluid pressure at said inlet opening of said valve casing exceeds said predetermined minimum pressure to permit such fluid pressure to force said outer peripheral portion, including said substantially parallel wall portions which define said groove, against said peripheral valve seat.

4. An improved emitter valve for subterranean irrigation systems and the like comprising:
 a valve casing having an outlet wall and an inlet wall; and a valve chamber extending between said outlet and inlet walls;
 an outlet opening in said outlet wall;
 a generally annular portion of said outlet wall around said outlet opening defining a peripheral valve seat;
 an inlet opening in said inlet wall of said valve casing;
 a valve member disposed within said valve chamber;
 said valve member having an outer surface portion facing said outlet opening of said valve casing;
 a resilient member connected to said outer surface portion of said valve member and extending outwardly toward said peripheral valve seat; said resilient member functioning to maintain said outer surface portion of said valve member spaced from said peripheral valve seat when the fluid pressure at said inlet opening of said valve casing is below a predetermined minimun pressure to permit the fluid initially introduced through said inlet opening and said valve chamber to flush foreign matter through said valve chamber and out of said outlet opening when fluid under pressure is initially introduced through said inlet opening; said resilient member being deformable when the fluid pressure at said inlet opening exceeds said predetermined minimum pressure to permit such fluid pressure to force a generally annular portion of said outer surface portion of said valve member into engagement with said peripheral valve seat.

5. In a valve structure comprising a valve chamber having an inlet opening and an outlet opening with a peripheral valve seat around said outlet opening, and further comprising a valve member in said valve chamber, said valve member having an outlet end portion facing said outlet opening and said peripheral valve seat, the improvement comprising an elongated resilient member connected to said outlet end portion of said valve member and extending outwardly toward said peripheral seat around said outlet opening;
 said resilient member functioning to maintain said outer end of said valve member spaced from said peripheral seat when the fluid pressure at said inlet opening of said valve chamber is below a predetermined minimum pressure to permit the fluid initially introduced through said inlet opening and said valve chamber to flush foreign matter through said valve chamber and out of said outlet opening when fluid under pressure is initially introduced through said inlet opening; said resilient member being deformable when the fluid pressure at said inlet opening exceeds said predetermined minimum pressure to force a generally annular peripheral portion of said outer end of said valve member into engagement with said peripheral valve seat.

6. An improved emitter valve for controlling the rate of flow of water in subterranean irrigation systems and the like comprising:
 a generally cylindrical valve casing having an outlet end wall and an inlet end wall;
 an outlet opening in said outlet end wall of said valve casing;
 a generally annular portion of said end wall around said outlet opening defining a peripheral valve seat;
 an inlet opening in said inlet end wall of said valve casing;
 a valve chamber in said valve casing between said inlet end wall and said outlet end wall;
 said valve chamber including a generally cylindrical inlet end portion in communication with said inlet opening in said inlet end wall, and a generally cylindrical outlet portion in communication with said outlet opening in said outlet end wall of said valve casing;
 said outlet portion of said valve chamber being of a greater diameter than said inlet portion of said chamber to define an annular seating surface between said inlet and outlet portions of said valve chamber;
 a generally cylindrical valve member disposed within said valve chamber for movement toward and away from said outlet opening;
 said valve member being made of a deformable material;
 said valve member including a generally cylindrical, larger-diameter portion disposed within said outlet portion of said valve chamber and a generally cylindrical, smaller-diameter portion extending into said inlet portion of said valve chamber;
 a generally annular seating surface on said valve member between said larger and smaller diameter portions thereof facing said annular seating surface in said valve chamber;
 said annular valve seat between said larger diameter and smaller diameter portions of said valve member cooperating with said annular valve seat in said valve chamber to prevent the flow of fluid through said valve chamber from said outlet opening to said inlet opening when the pressure at said outlet opening exceeds the pressure at said inlet opening;
 said larger diameter portion of said valve member having an outer end surface facing said outlet opening of said valve casing; said outer end surface including a center portion which faces said outlet opening in said outlet end wall of said valve casing and being in substantial alignment therewith;

an upstanding, annular wall on said outer end surface of said larger diameter portion of said valve member; said upstanding annular wall facing said peripheral valve seat around said outlet opening on said outlet end wall of said valve casing;

means defining a groove in said upstanding annular wall;

a pair of upstanding, radially extending wall members on said outer end surface of said larger diameter portion of said valve member extending radially inwardly from said upstanding annular wall, on either side of said groove, to a point adjacent to said center portion of said outer end surface;

said upstanding wall members defining a fluid flow channel therebetween in communication with said groove in said upstanding annular wall;

said upstanding wall members and the portions of said upstanding annular wall adjacent said groove being deformable against said peripheral seat on said outer end wall of said casing to progressively decrease the cross-sectional area of said channel and said groove as the pressure of fluid introduced at said inlet opening of said valve casing increases above a predetermined pressure to thereby control the flow of water through said groove and channel in accordance with the pressure variations of the fluid introduced through said inlet opening of said casing.

7. An improved emitter valve for controlling the rate of flow of water in subterranean irrigation systems and the like comprising:

a generally cylindrical valve casing having an outlet end wall and an inlet end wall;

an outlet opening in said outlet end wall of said valve casings;

a generally annular portion of said end wall around said outlet opening defining a peripheral valve seat;

an inlet opening in said inlet end wall of said valve casing;

a valve chamber in said valve casing between said inlet end wall and said outlet end wall;

said valve chamber including a generally cylindrical inlet end portion in communication with said inlet opening in said inlet end wall, and a generally cylindrical outlet portion in communication with said outlet opening in said outlet end wall of said valve casing;

said outlet portion of said valve chamber being of a greater diameter than said inlet portion of said chamber to define an annular seating surface between said inlet and outlet portions of said valve chamber;

a generally cylindrical valve member disposed within said valve chamber for movement toward and away from said outlet opening;

said valve member including a generally cylindrical, larger-diameter portion disposed within said outlet portion of said valve chamber and a generally cylindrical, smaller-diameter portion extending into said inlet portion of said valve chamber;

a generally annular seating surface on said valve member between said larger and smaller diameter portions thereof facing said annular seating surface in said valve chamber; and a resilient finger connected to said outer end surface of said valve member and extending outwardly toward said peripheral seat around said outlet opening of said valve casing;

said resilient finger functioning to maintain said valve member spaced from said outlet end wall of said valve casing when the fluid pressure at said inlet opening of said valve casing is below a predetermined minimum pressure; said resilient finger being deformable when the fluid pressure at said inlet opening exceeds a predetermined minimum pressure to force a generally annular peripheral head portion of said outer end of said valve member into engagement with said peripheral valve seat, thereby permitting the fluid initially introduced through said inlet opening and said valve chamber to flush foreign matter through said outlet opening when fluid under pressure is initially introduced through said inlet opening.

8. An improved emitter valve, comprising:

A valve casing having an inlet opening, an outlet opening and a valve chamber between said inlet and outlet openings;

means defining a valve seat around said outlet opening of said valve casing;

a valve member disposed in said valve chamber;

said valve member having an outer surface facing said outlet opening of said valve casing; said outer surface being formed of a resilient material; said outer surface having an outer peripheral portion in substantial alignment with said valve seat around said outlet opening of said valve casing; said outer peripheral portion of said resilient outer surface being adapted to engage said valve seat around said outlet opening when fluid under pressure is introduced through said inlet opening and into said valve chamber at a pressure greater than a predetermined pressure; and a resilient member connected to said outer end surface of said valve member and extending outwardly toward said valve seat around said outlet opening of said valve casing; said resilient member maintaining said valve member spaced from said outlet end wall of said valve casing when the fluid pressure at said inlet opening of said valve casing is below a predetermined minimum pressure to permit fluid initially introduced through said inlet opening and said valve chamber to flush foreign matter through said outlet opening when fluid is initially introduced through said inlet opening; said resilient member being deformable when the fluid pressure at said inlet opening exceeds a predetermined minimum pressure to permit such fluid pressure to force said outer peripheral portion of said outer surface of said valve member into engagement with said valve seat around said outlet opening of said valve casing.

9. An improved emitter valve, comprising:

a valve casing having an inlet opening, an outlet opening and a valve chamber between said inlet and outlet openings;

means defining a valve seat around said outlet opening of said valve casing;

a valve mamber disposed in said valve chamber;

said valve member having an outer surface facing said outlet opening of said valve casing; said outer surface having an outer peripheral portion in substantial alignment with said valve seat around said outlet opening;

a resilient, upstanding, substantially peripheral wall on said outer peripheral portion of said outer surface of said valve member; said upstanding resilient wall facing said valve seat around said outlet opening of said valve casing;

means defining a groove in said resilient, upstanding, substantially peripheral wall for permitting the passage of fluid therethrough;

said upstanding resilient wall being adapted to be forced into engagement with said valve seat around said outlet opening of said valve casing when fluid is introduced through said inlet opening of said valve casing;

said upstanding resilient wall, including the portions of said wall on either side of said groove, being deformable when the pressure of fluid introduced through said inlet opening of said valve casing exceeds a predetermined pressure, thereby decreasing the area of said groove through which fluid may pass.

10. An improved emitter valve, comprising:

a valve casing having an inlet opening, and outlet opening and a valve chamber between said inlet and outlet openings;

means defining a valve seat around said outlet opening of said valve casing;

a valve member disposed in said valve chamber;

said valve member having an outer surface facing said outlet opening of said valve casing; said outer surface having an outer peripheral portion in substantial alignment with said valve seat around said outlet opening;

a resilient, upstanding, substantially peripheral wall on said outer peripheral portion of said outer surface of said valve member; said upstanding, resilient wall facing said valve seat around said outlet opening of said valve casing;

means defining a groove in said resilient, upstanding, substantially peripheral wall for permitting the passage of fluid therethrough;

a resilient member connected to said outer end surface of said valve member and extending outwardly toward said valve seat around said outlet opening of said valve casing; said resilient member maintaining said upstanding resilient wall on said outer peripheral portion of said outer surface of said valve member spaced from said valve seat when the fluid pressure at said inlet opening of said valve casing is below a predetermined minimum pressure to permit the fluid initially introduced through said inlet opening and said valve chamber to flush foreign matter through said outlet opening when fluid is initially introduced through said inlet opening; said resilient member being deformable when the fluid pressure at said inlet opening exceeds a predetermined minimum pressure to permit such fluid pressure to force said upstanding resilient wall into engagement with said valve seat around said outlet opening of said valve casing;

said upstanding, resilient wall, including the portions of said wall on either side of said groove, being deformable when the pressure of fluid introduced through said inlet opening of said valve casing exceeds a predetermined pressure, thereby decreasing the area of said groove through which fluid may pass.

11. An improved emitter valve for subterranean irrigation systems and the like, comprising:

a valve casing having an inlet opening, an outlet opening and a valve chamber between said inlet and outlet openings;

means defining a generally annular valve seat around said valve opening of said valve casing;

a valve member disposed in said valve chamber;

said valve chamber having an outer surface facing said outlet opening of said valve casing;

said valve member being formed of a resilient material;

said outer surface of said valve member having a central portion in substantial alignment with said outlet opening of said valve casing;

said outer surface of said valve member having an annular outer portion in substantial alignment with said annular valve seat around said outlet opening of said valve casing;

a generally annular, upstanding, outer peripheral wall on said annular outer portion of said outer surface of said valve member;

a generally annular, upstanding, inner peripheral wall on said annular outer portion of said outer surface of said valve member;

said inner and outer upstanding, generally annular wall portions being radially spaced from one another;

means defining a groove in said outer upstanding, generally annular wall; and means defining a groove in said inner, upstanding, generally annular wall;

said grooves in said inner and outer, upstanding generally annular walls being in substantial alignment with one another;

a pair of upstanding, substantially parallel wall members connecting said inner and outer upstanding walls on either side of said grooves to define a generally radial channel through which fluid may pass;

said inner and outer, upstanding, generally annular walls being adapted to be forced into engagement with said peripheral valve seat around said outlet opening of said valve casing when fluid is introduced through said inlet opening of said valve casing;

said substantially parallel upstanding walls defining said channel being deformable when the pressure of fluid introduced through said inlet opening of said valve casing exceeds a predetermined pressure, thereby decreasing the cross-sectional area of said channel through which fluid may pass.

12. An improved emitter valve according to claim 11, and further including a resilient finger connected to said annular outer portion of said outer surface of said valve member between said inner and outer upstanding walls; said resilient finger extending outwardly toward said peripheral seat around said outlet opening of said valve casing; said resilient finger maintaining said inner and outer upstanding walls spaced from said peripheral valve seat when the fluid pressure at said inlet opening of said valve casing is below a predetermined minimum pressure to permit fluid initially introduced through said inlet opening of said valve chamber to flush foreign matter through said outlet opening when fluid under pressure is initially introduced through said inlet opening; said resilient finger being deformable when the fluid pressure at said inlet opening exceeds a predetermined minimum pressure to permit such fluid pressure to force said inner and outer upstanding walls into engagement with said peripheral valve seat around said outlet opening of said valve casing.

* * * * *